United States Patent [19]

Klingel et al.

[11] 4,235,658
[45] Nov. 25, 1980

[54] PROCESS FOR MAKING TRANSLUCENT PLATES WITH LIGHT-SCATTERING SURFACES

[75] Inventors: Hans Klingel, Leonberg, Fed. Rep. of Germany; Wolfgang Klingel, Dieselstr. 20, D-7250 Leonberg, Del.X

[73] Assignee: Wolfgang Klingel, Leonberg, Fed. Rep. of Germany

[21] Appl. No.: 64,585

[22] Filed: Aug. 7, 1979

[30] Foreign Application Priority Data

Aug. 9, 1978 [DE] Fed. Rep. of Germany ....... 2834849

[51] Int. Cl.³ .......................... B05D 3/12; B05D 5/02; B32B 31/08; B32B 33/00
[52] U.S. Cl. ............................... 156/244.12; 427/162; 427/164; 427/277
[58] Field of Search .................. 156/244.12; 427/162, 427/164, 277

[56] References Cited

U.S. PATENT DOCUMENTS

3,306,956  2/1967  Barnette .............................. 428/38 X

*Primary Examiner*—James R. Hoffman
*Attorney, Agent, or Firm*—Karl F. Ross

[57] ABSTRACT

An extruded, hollow profile of light-transmissive thermoplastic material, especially polyvinylchloride or a polyacrylate, is coated on at least one major side with a film of compatible, cold-hardening, light-stabilized transparent liquid resin, such as a polyester or an acrylic, whose surface is being deformed by contact with an embossed pattern carrier. The film may be stained and/or reinforced by an embedded glass-fiber insert.

5 Claims, 3 Drawing Figures

PROCESS FOR MAKING TRANSLUCENT PLATES WITH LIGHT-SCATTERING SURFACES

FIELD OF THE INVENTION

Our present invention relates to a process for making translucent plates provided with light-scattering surfaces on one or both of their major sides, e.g. as used for doors, windows or bathroom partitions.

BACKGROUND OF THE INVENTION

Several methods have already been proposed for making such plates. Thus, U.S. Pat. No. 3,306,956 describes a process wherein a mold is lined with a creased foil preparatorily to the casting of a layer of transparent or translucent synthetic resin designed to form the body of a decorative plate or panel to be produced. Another technique, described in our German Pat. No. 2,511,895 published Sept. 8, 1977, utilizes a rigid core formed from webs or a honeycomb structure to which a pair of thermoplastic cover plates are bonded on opposite sides; these plates may be provided, on their exposed surfaces, with an embossed pattern.

OBJECTS OF THE INVENTION

The general object of our present invention is to provide a simple process for producing all-plastic translucent plates of light weight, with a hollow structure, having a light-scattering pattern on one or both of their major surfaces.

A more particular object is to provide a process for producing such plates in a manner that will allow them to be cut into sections without any risk of separation of a patterned surface layer from the plate body.

SUMMARY OF THE INVENTION

We realize these objects, pursuant to our present invention, by coating an extruded flat, hollow profile of light-transmissive thermoplastic material, on at least one of its major sides, with a film of cold-hardening, light-stabilized and transparent resin deposited thereon in a liquid state, deforming that film by contact with an embossed pattern carrier, and allowing the film to harden.

We prefer to use polyvinylchloride or a polyacrylate for the hollow profile. A film-forming resin compatible therewith could be a polyester or an acrylic, the latter particularly where the substrate is a methacrylate-based polymer. Such films bond firmly with the substrates referred to so as to avoid any risk of detachment, liable to produce unsightly white spots due to moisture penetration, even when the resulting plate is cut into sections. This is also true when the film is reinforced, in a manner known per se, by embedding therein an insert of glass fibers prior to the hardening of the resin.

The film may be stained by admixture with a coloring agent before the resin is deposited on the extruded profile.

BRIEF DESCRIPTION OF THE DRAWING

Our invention will now be described in greater detail with reference to the accompanying drawing in which.

SPECIFIC DESCRIPTION

Figure 1:
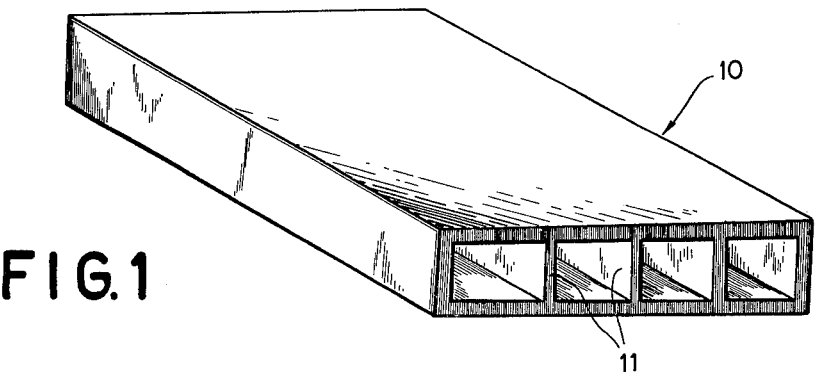
FIG. 1 is a perspective view of a hollow plate body cut from an extruded profile.
Figure 2:
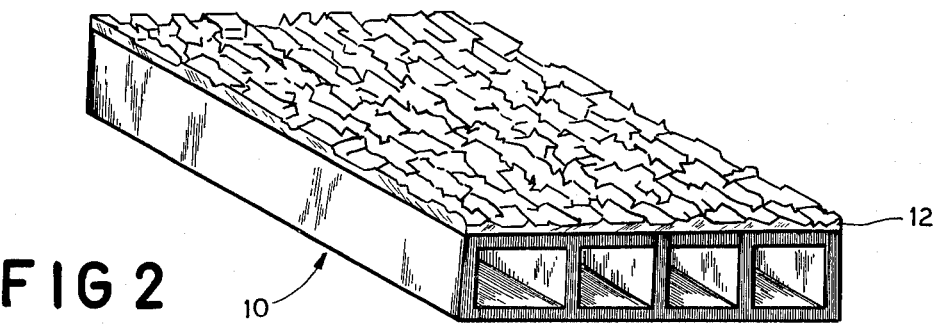
FIG. 2 is a similar view of the same plate body provided with a light-scattering surface produced in accordance with our present processs.

In FIG. 1 we have shown a hollow thermoplastic body 10 in the form of a flat profile, with parallel internal webs 11, produced by extrusion. FIG. 2 shows the same body 10 provided on its upper surface with a resinous film 12 deposited thereon in liquid form and embossed by contact with a suitable pattern carrier prior to hardening. The thickness of the film 12 is a small fraction of the overall thickness of the resulting plate but should be sufficient to allow for the embedding of a glass-fiber mat or fabric if such reinforcement is desired, e.g. where the plate is to be used as a wall member in a swimming pool, sports stadium or other location in which it may be subjected to severe stresses.

A similar coating 12 may, of course, be applied to the lower surface of body 10.

Figure 3:
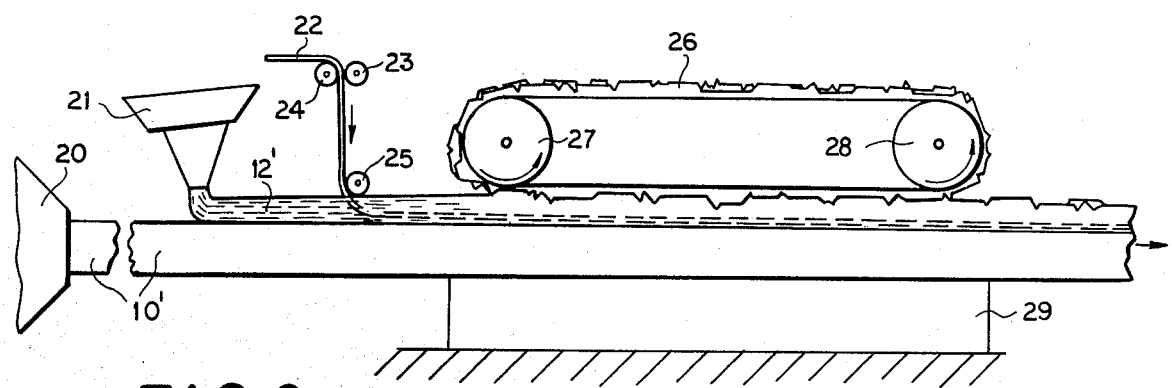
FIG. 3 schematically illustrates a continuous process for patterning a surface of such a profile.

In FIG. 3 we have shown by way of example a system for carrying out our improved process in a continuous manner on an extruded profile 10' of indefinite length issuing from an extruder 20. A hopper 21 is used for depositing a film 12' of compatible cold-hardening resinous material onto the upper surface of profile 10' whereupon a glass-fiber mat 22 is embedded in that film with the aid of feed rollers 23, 24 and a deflecting roller 25. An endless conveyor band 26, driven by rollers 27, 28, serves as a carrier for the negative of an embossed pattern which is to be printed on the exposed film surface. Carrier 26 moves at the extrusion speed of profile 10' which is supported on a base 29 below that conveyor.

A particularly suitable cold-hardening transparent resin for the film 12 or 12' is a polyester based on orthophthalic acid which may be admixed with a polyacrylate, as described in our prior German Pat. No. 2,511,895, especially if the thermoplastic material of the profile is a polymethacrylate. Such a polyester film, however, can also be used with PVC profiles.

In all instances, of course, the pattern carrier must deform the film when the latter is no longer flowable, or remain in contact therewith until such time, in order to prevent spontaneous leveling of the deformations so imparted.

We claim:

1. A process of making translucent plates with light-scattering surfaces, comprising the steps of:
   extruding a hollow profile of light-transmissive thermoplastic material with two flat major sides;
   depositing an adhering film of cold-hardening, light-stabilized and transparent liquid resin on at least one of said major sides;
   deforming the deposited film by contact with an embossed pattern carrier; and
   allowing the deformed film to harden on said profile.

2. A process as defined in claim 1 wherein a glass-fiber insert is embedded in said film prior to hardening thereof.

3. A process as defined in claim 1 wherein said liquid resin is stained by admixture with a coloring agent prior to deposition on said profile.

4. A process as defined in claim 1, 2 or 3 wherein said thermoplastic material is polyvinylchoride or a polyacrylate.

5. A process as defined in claim 4 wherein said liquid resin is a polyester or an acrylic.

* * * * *